United States Patent
Chamblee et al.

(10) Patent No.: US 8,760,973 B1
(45) Date of Patent: Jun. 24, 2014

(54) CARBON NANOTUBE POLYMER COMPOSITE HOSE WALL

(71) Applicants: Heather L Chamblee, Bristol, RI (US); William L Keith, Ashaway, RI (US)

(72) Inventors: Heather L Chamblee, Bristol, RI (US); William L Keith, Ashaway, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 153 days.

(21) Appl. No.: 13/628,736

(22) Filed: Sep. 27, 2012

(51) Int. Cl.
- *G01V 1/18* (2006.01)
- *C01B 31/02* (2006.01)
- *B82Y 99/00* (2011.01)
- *B82Y 40/00* (2011.01)

(52) U.S. Cl.
USPC .......................................................... 367/173

(58) Field of Classification Search
USPC ............ 367/173, 153; 977/742, 842; 204/450
See application file for complete search history.

(56) References Cited

U.S. PATENT DOCUMENTS

| | | | |
|---|---|---|---|
| 6,683,819 B1 * | 1/2004 | Estaphan et al. | 367/106 |
| 2010/0203328 A1 * | 8/2010 | Hochstetter et al. | 977/742 |
| 2012/0176859 A1 * | 7/2012 | Pabon et al. | 367/20 |

FOREIGN PATENT DOCUMENTS

WO    WO 2013093358 A1 *    6/2013

* cited by examiner

*Primary Examiner* — Daniel Pihulic
(74) *Attorney, Agent, or Firm* — James M. Kasischke; Michael P. Stanley

(57) ABSTRACT

An acoustic array hose is provided for towing behind a marine vessel. The acoustic array includes acoustic sensors, a hydraulic fill-fluid circumferentially surrounding the acoustic sensors, and an array hose wall of polyurethane with single wall carbon nanotubes embedded therein. The hose wall circumferentially surrounds the hydraulic fill fluid along a length of the array hose. When an electrical current is applied to the towed array, the nanotubes align with the hose wall with the effect of strengthening the hose wall of the towed array.

5 Claims, 4 Drawing Sheets

US 8,760,973 B1

CARBON NANOTUBE POLYMER COMPOSITE HOSE WALL

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The present invention generally relates to a towed acoustic sensor array. More particularly, the invention is an improved hose wall of an acoustic towed array in which the hose wall provides strengthening and increased reliability.

(2) Description of the Prior Art

Naval vessels and geophysical exploration vessels routinely deploy acoustic arrays for detection and analysis of undersea structures and objects. A vessel can tow an array of sound receiving hydrophones arranged in a passive array hose. The passive array hose, in conjunction with sound receiving and signal processing electronics, can detect sounds in the water.

In other arrangements, the vessel can tow a passive array of sound receiving hydrophones and can also tow an acoustic projector in which the hydrophones and the projector form a bi-static active sonar system. With this arrangement, the towed acoustic projector emits sound pulses. Each sound pulse travels through the water to strike objects or targets, which in turn produce echoes. The echoes are received by the array of hydrophones. The direction of the echoes indicates the location of an underwater object. In conventional bi-static active sonar systems, the acoustic projector is often deployed and towed separately from the array.

U.S. Pat. No. 6,683,819 discloses a sonar array system including a receiving array of hydrophones and a transmit array of acoustic projectors disposed on a common axis of a cable. The cable is extended and retrieved by a winch. The transmit array has one or more acoustic projectors capable of generating sound and the receive array has one or more hydrophones capable of receiving sound. The acoustic projectors are disposed on a transmit array axis, and the one or more hydrophones are disposed on a receive array axis. The receive array axis and the transmit array axis have a common axis; therefore, forming contiguous line arrays (one array for receiving and one array for transmitting).

The towed array is typically attached to a tow cable that is reeled off a ship so that the sonar array stretches for a distance of a mile or more. Due to the forces imposed (flow-induced vibration and drag) on the towed array because of the reeling; improvements in strengthening are desirable for increasing reliability and life span of the acoustic array.

In addition to concerns about mechanical wear and strength, improvements in removing heat from various components of a sonar array system are helpful for extending the longevity of electronic components and in preventing electrical breakdown between various components of the array system.

SUMMARY OF THE INVENTION

Accordingly, it is an object of the present invention to improve the strength, durability and lifespan of an acoustic towed array.

Another object of the present invention is to provide improved heat transfer from the acoustic towed array.

To attain the objects described, an acoustic towed array is provided and includes acoustic sensors and nonconductive fill fluid circumferentially surrounding the acoustic sensors, internal strength members, and a hose wall of polyurethane composite including single wall carbon nanotubes embedded therein. The hose wall circumferentially surrounds the nonconductive fill fluid. When an electrical field (generated on the towing vessel and external to the array) is applied to the hose during handling (reeling or unreeling); the carbon nanotubes impregnated in the hose wall become aligned in a parallel orientation, thereby stiffening and strengthening the hose of the towed array.

The heat conductive carbon nanotubes also promote passive heat transfer through the hose wall; thereby, reducing failures of the internal electrical components due to overheating. The carbon nanotubes need not be aligned for improved thermal heat conduction. As such, the mere presence of the carbon nanotubes within the polyurethane improves heat transfer.

BRIEF DESCRIPTION OF THE DRAWINGS

The above and other objects, features and advantages of the present invention will become apparent in view of the following figures taken in conjunction with the specification and claims.

DETAILED DESCRIPTION OF THE INVENTION

Figure 1:
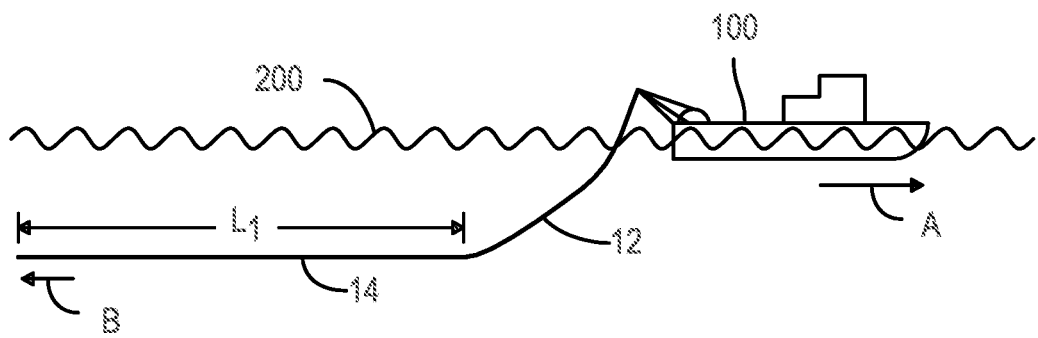
FIG. 1 is a diagram of a marine vessel towing an acoustic towed array in accordance with the invention.

Referring now to the drawings, and more particularly to FIG. 1, a hose of an acoustic towed array 14 is attached to a tow cable 12 behind a marine vessel 100 in which the vessel could be either a surface or a subsurface vessel traveling on or below a water surface 200. The hose of an acoustic towed array 14 acts as a sonar antenna and may extend for over a mile. The towed array 14 and tow cable 12 can also be towed by low flying aircraft, such as a helicopter or other aircraft.

The towed array 14 and the tow cable 12 are connected at an end and stored on a reel on the rear of the vessel 100, then unreeled (as shown) so that the towed array is below the water surface 200. As the vessel 100 moves in the direction indicated by arrow "A"; the towed array 14 is subjected to drag due to skin friction along a length $L_1$ of the array; thereby, creating a friction force in the direction shown by arrow "B". In addition to the drag due applied to the towed array 14; stresses are applied to the array by a winch handling system on the vessel 100 which unreels and reels in the hose of the towed array and the tow cable 12.

Figure 2:
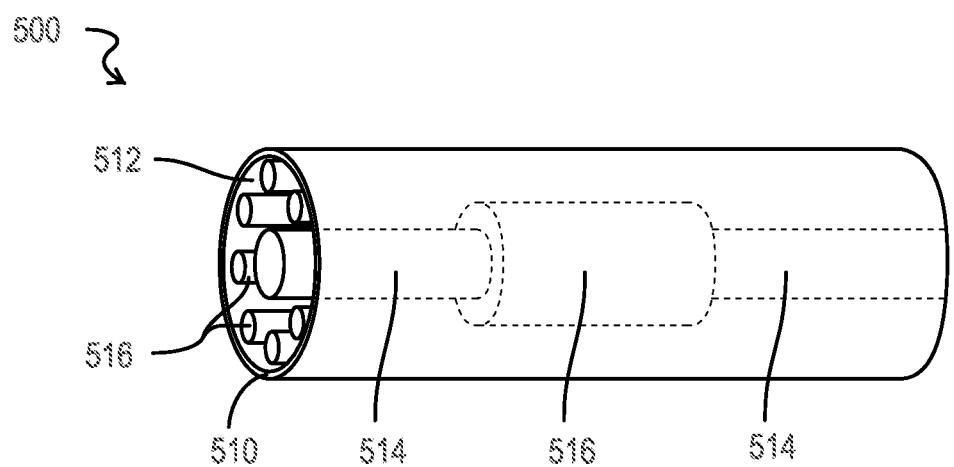
FIG. 2 is a prior art view of an acoustic array hose.

FIG. 2 is a prior art diagram of a partial array hose section 500 in which the hose section has a hose wall 510. An interior 512 of the hose section 500 is typically filled with neutrally-buoyant nonconductive oil. A communication line 514 and a plurality of strength members 516 extend through the fluid-filled interior 512. The communication line 514 can be either an electrical line or a fiber optic line. Hydrophones 516 are joined to the communication line 514 and positioned at intervals within the interior 512.

Figure 3:
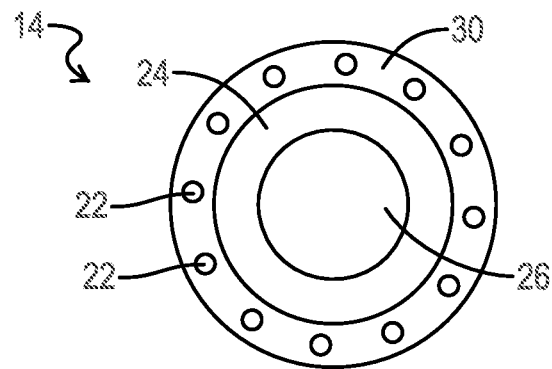
FIG. 3 is a cross-sectional view of a hose of the towed array in accordance with the invention.

The hose of the towed array 14 is constructed in accordance with FIG. 3. The hose of the towed array 14 includes a composite hose wall 30.

Strengthening members 22 are embedded within the polyurethane composite extending along the length $L_1$ (see FIG. 1) of the array hose 14. The strengthening members 22 are constructed from nylon polyester or from a synthetic fiber of high tensile strength. An electrical or fiber optic communication line 26 also extends along the length of the hose of the towed array 14 and hydrophones (not shown) are joined to and positioned along the communications line. Neutrally buoyant oil 24 fills the space between the communication line 26 and the composite hose wall 30.

Figure 4A:
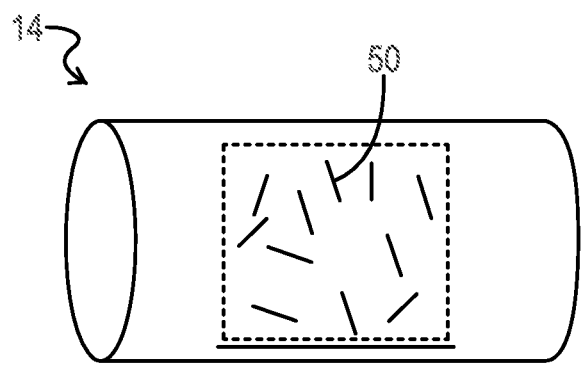
FIG. 4A is a diagram of a section of the hose in accordance with the principles of the invention.

When the towed array 14 and the tow cable 12 are deployed and extended in the water as shown in FIG. 1; then single wall carbon nanotubes 50 are embedded and randomly arranged within the polyurethane—as shown in FIG. 4A. The single wall carbon nanotubes 50 typically have a diameter of approximately one nanometer with a tube length that can be millions of times longer.

Figure 4B:
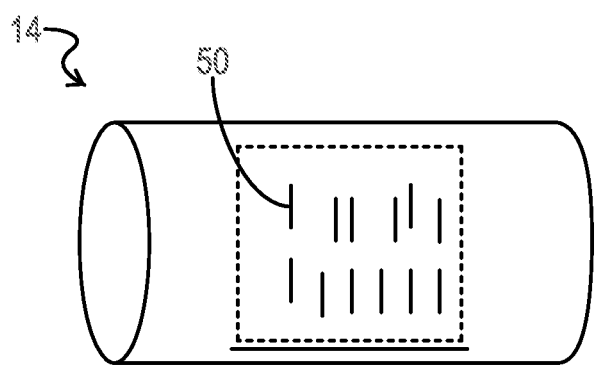
FIG. 4B is a diagram of the section of the hose of FIG. 4A with an electrical field applied thereto.

During reeling or unreeling of the towed array 14 and the attached tow cable 12 from the marine vessel 100; an electrical current is activated from the vessel along the hose of the towed array, which in turn creates an electric field extending radially throughout the composite hose wall 30. This radially-applied field causes the single wall carbon nanotubes 50 embedded within the composite hose wall 30 to align in a same direction parallel to one another along their longitudinal axes as shown in FIG. 4B.

The electrical current can be applied along the hose of the towed array 14 through the communications line 26, by other separate electrical wires and components in the hose, or generated by a device in the proximity of the handling system in which the device is independent of the array components.

By creating an electrical field across the composite hose wall 30 (embedded with the nanotubes 50); the hose wall and the overall hose of the towed array 14 are stiffened and strengthened during the reeling and unreeling of the cable 12 and the hose of the towed array to and from the vessel 100; thereby, increasing strength, reliability and lifespan. When the cable 12 and the hose of the towed array 14 are fully extended into the water for acoustical operations; the acoustical performance of the towed array is unaffected because there is no electrical current being applied to the communication line 26 and there is no electrical field generated across the composite hose wall 30.

Since carbon nanotubes are substantive thermal conductors; their presence within the composite hose wall 30 promotes passive heat transfer through the hose wall; thereby, reducing failures due to the overheating of internal components.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. An acoustic array attachable to a cable for towing behind a vessel, said array comprising:
    a plurality of acoustic sensors positioned along a longitudinal axis of said array;
    hydraulic fill fluid surrounding said acoustic sensors; and
    a hose with a wall circumferentially surrounding said hydraulic fill fluid, said hose having a polyurethane composite material with a plurality of single wall carbon nanotubes embedded within the polyurethane composite material;
    wherein said nanotubes align in response to an electrical field applied to said array such that said hose is strengthened.

2. The acoustic array of claim 1 wherein said hose wall further comprises strengthening members extending longitudinally throughout the composite material.

3. The acoustic array of claim 2 wherein each of said nanotubes has a diameter of approximately one nanometer.

4. A method for strengthening an acoustic array, said method comprising the steps of:
    providing the acoustic array with a hose wall having polyurethane material with embedded single wall carbon nanotubes;
    applying an electrical field to the hose wall; and
    aligning the nanotubes such that the acoustic array is strengthened.

5. The method of claim 4 further comprising the step of passively transferring heat from the acoustic array via the single wall carbon nanotubes.

* * * * *